(12) United States Patent
Shin et al.

(10) Patent No.: US 9,942,453 B2
(45) Date of Patent: Apr. 10, 2018

(54) MOBILE TERMINAL AND METHOD FOR CONTROLLING THE SAME

(71) Applicant: LG ELECTRONICS INC., Seoul (KR)

(72) Inventors: Yunsup Shin, Seoul (KR); Salkmann Ji, Seoul (KR); Yungwoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 14/852,129

(22) Filed: Sep. 11, 2015

(65) Prior Publication Data

US 2016/0109232 A1    Apr. 21, 2016

Related U.S. Application Data

(60) Provisional application No. 62/066,649, filed on Oct. 21, 2014.

(30) Foreign Application Priority Data

Jun. 23, 2015    (KR) .................. 10-2015-0089110

(51) Int. Cl.
*G01C 3/08*     (2006.01)
*H04N 5/225*    (2006.01)
(Continued)

(52) U.S. Cl.
CPC .............. *H04N 5/232* (2013.01); *G01C 3/085* (2013.01); *H04N 5/2256* (2013.01);
(Continued)

(58) Field of Classification Search
CPC ............ H04N 5/2256; H04N 13/0203; H04N 13/0207; H04N 13/0253; H04N 5/2354; H04N 2013/0081; G01C 3/085
See application file for complete search history.

(56) References Cited

U.S. PATENT DOCUMENTS

2010/0290674 A1    11/2010   Kim
2012/0154537 A1    6/2012    Chang et al.
(Continued)

FOREIGN PATENT DOCUMENTS

KR    10-2006-0063331    6/2006
KR    10-2013-0136872    12/2013

OTHER PUBLICATIONS

PCT International Application No. PCT/KR2015/009940, Written Opinion of the International Searching Authority dated Jan. 25, 2016, 10 pages.

*Primary Examiner* — Neil Mikeska
(74) *Attorney, Agent, or Firm* — Lee, Hong, Degerman, Kang & Waimey

(57) ABSTRACT

Disclosed are a mobile terminal having a plurality of light emitting devices, and a method for controlling the same. The mobile terminal includes a camera; a light emitting portion including a plurality of light emitting units; and a controller configured to control the light emitting portion to emit light, such that depth information of an image received through the camera is extracted, wherein the controller determines the number of light emitting units which emit light among the plurality of light emitting units, based on a distance between a subject corresponding to the image and the camera.

16 Claims, 15 Drawing Sheets

(51) Int. Cl.
  *H04N 5/232* (2006.01)
  *H04N 5/235* (2006.01)
  *H04N 13/02* (2006.01)
  *H04N 13/00* (2018.01)

(52) U.S. Cl.
  CPC ....... *H04N 5/2354* (2013.01); *H04N 13/0203* (2013.01); *H04N 13/0207* (2013.01); *H04N 13/0253* (2013.01); *H04N 2013/0081* (2013.01)

(56) References Cited

U.S. PATENT DOCUMENTS

| | | | |
|---|---|---|---|
| 2012/0257795 A1 | 10/2012 | Kim et al. | |
| 2014/0002609 A1* | 1/2014 | Kim | H04N 13/0253 348/46 |
| 2014/0078490 A1* | 3/2014 | Higo | G01B 11/25 356/4.01 |
| 2014/0340572 A1* | 11/2014 | Sato | G03B 7/08 348/370 |
| 2016/0286202 A1* | 9/2016 | Romano | G01S 17/46 |

* cited by examiner (a)

(b)

(a)

[EXTRACTION OF 3D PRINTING DATA]

(b)

[SENSING OF MOTION]

MOBILE TERMINAL AND METHOD FOR CONTROLLING THE SAME

CROSS-REFERENCE TO RELATED APPLICATION

Pursuant to 35 U.S.C. § 119(a), this application claims the benefit of U.S. Provisional Application No. 62/066,649, filed on Oct. 21, 2014, and also claims the benefit of earlier filing date and right of priority to Korean Patent Application No. 10-2015-0089110, filed on Jun. 23, 2015, the contents of which are all hereby incorporated by reference herein in their entirety.

BACKGROUND OF THE INVENTION

1. Field of the Invention

The present invention relates to a mobile terminal, and more particularly, to a mobile terminal having light emitting devices and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

As a camera is developed to have high performance, various functions using such a camera are being researched. For instance, a function to capture still images or moving images of a high picture quality, a function to generate a 3D image using depth information (depth value) of an image received through the camera, etc. are being actively researched.

When the various functions using such a camera are executed, light emitting devices should play an important role. The light emitting devices serve to emit light to a space corresponding to an image received through a camera.

Accordingly, development of light emitting devices for executing various functions using a camera, a method for controlling the light emitting devices, etc. is needed.

SUMMARY OF THE INVENTION

Therefore, an aspect of the detailed description is to provide a mobile terminal capable of extracting depth information of an image received through a camera, using light emitted from light emitting devices, and a method for controlling the same.

Another aspect of the detailed description is to provide a mobile terminal capable of controlling light emitting devices in an optimum manner, and a method for controlling the same.

Still another aspect of the detailed description is to provide a mobile terminal capable of extracting depth information in an optimized manner by controlling light emitting devices differently according to a situation, and a method for controlling the same.

To achieve these and other advantages and in accordance with the purpose of this specification, as embodied and broadly described herein, there is provided a mobile terminal, including: a camera; a light emitting portion including a plurality of light emitting units; and a controller configured to control the light emitting portion to emit light, such that depth information of an image received through the camera is extracted, wherein the controller determines the number of light emitting units which emit light among the plurality of light emitting units, based on a distance between a subject corresponding to the image and the camera.

In an embodiment, the number of light emitting units which emit light among the plurality of light emitting units may be increased when the distance becomes long, and may be decreased when the distance becomes short.

In an embodiment, each of the plurality of light emitting units may include a plurality of light emitting devices, and the plurality of light emitting devices may be formed to have the same pattern according to each of the light emitting units.

In an embodiment, the mobile terminal may further include a plurality of lenses formed to correspond to the plurality of light emitting units, respectively. The controller may control the plurality of lenses such that light emitted from the plurality of light emitting units is irradiated to overlap the subject.

In an embodiment, the controller may relatively-rotate at least part of the plurality of lenses based on a distance between the subject and the camera, such that the light is irradiated to overlap the subject.

In an embodiment, the number of light emitting units which emit light among the plurality of light emitting units may be determined based on at least one of the amount of light emitted from the light emitting units and then reflected from the subject, and a condition of peripheral light.

In an embodiment, each of the plurality of light emitting units may include a plurality of light emitting devices, and the plurality of light emitting devices may be formed to have a different pattern according to each of the plurality of light emitting units.

In an embodiment, the controller may determine the number of light emitting units which emit light among the plurality of light emitting units, based on a type of an operation mode related to depth information.

In an embodiment, the controller may increase the number of light emitting units which emit light when the distance is long.

In an embodiment, each of the plurality of light emitting units may include a plurality of light emitting devices, and the plurality of light emitting units may be grouped such that at least two light emitting units belong to a single group. Light emitting units included in each group may have a plurality of light emitting devices formed to have the same pattern, and light emitting units included in a different group may have a plurality of light emitting devices formed to have a different pattern.

In an embodiment, the controller may control the plurality of light emitting units by group, based on at least one of a distance between a subject corresponding to the image and the camera, the amount of light emitted from the light emitting units and then reflected from the subject, a condition of peripheral light, and a type of an operation mode related to depth information.

To achieve these and other advantages and in accordance with the purpose of this specification, as embodied and broadly described herein, there is also provided a method for controlling a mobile terminal, including: receiving an image through a camera; sensing a distance between a subject corresponding to the image and the camera; and determining the number of light emitting units which emit light among a plurality of light emitting units, based on a distance between the subject corresponding to the image and the camera.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
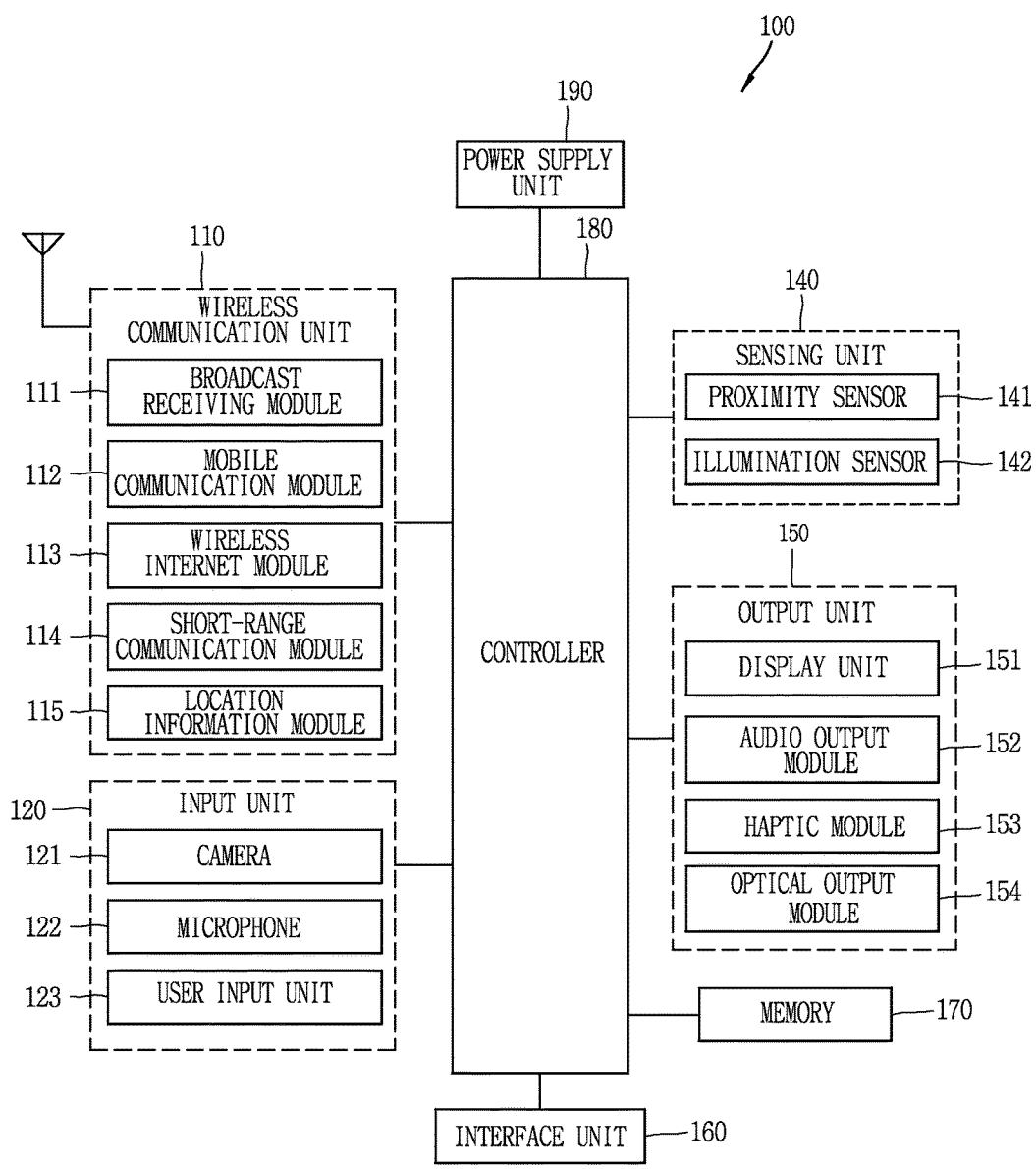
FIG. 1A is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
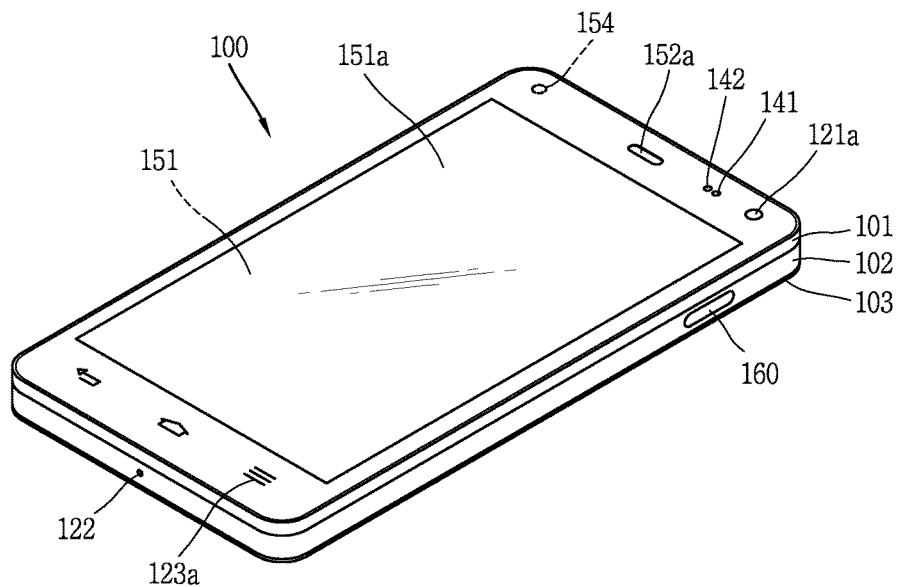
FIGS. 1B and 1C are conceptual views illustrating an example of a mobile terminal according to the present invention, which are viewed from different directions.
Figure 1C:
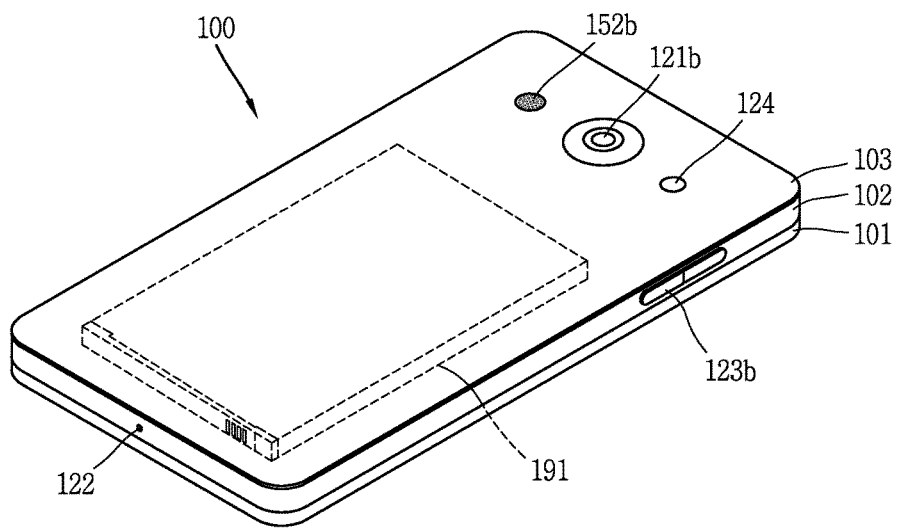

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Hereinafter, a method for extracting depth information of an image received through a camera using light emitting devices of a mobile terminal, and a method for controlling the light emitting devices, will be explained in more detail with reference to the attached drawings.

In explaining the following descriptions with respect to the attached drawings, in a case where at least two images are illustrated in a single drawing (FIG. N) in the form of 2 by 2, an image illustrated on a left upper side is called "first drawing", an image illustrated on a right upper side is called "second drawing", an image illustrated on a right lower side is called "third drawing", and an image illustrated on a left lower side is called "fourth drawing".

In a case where at least two images are illustrated in a line in a direction toward a lower end from an upper end, an image disposed on the uppermost end is called "first drawing", and the rest images are called "second drawing, third drawing . . . " in order.

In a case where at least two images are illustrated in a line in a direction toward a right end from a left end, an image disposed on the leftmost end is called "first drawing", and the rest images are called "second drawing, third drawing . . . " in order.

The mobile terminal 100 of the present invention may extract depth information of an image received through the camera 121 (refer to FIG. 1A).

The image received through the camera may be called 'preview image'. More specifically, the preview image means an image received through the camera real time. The preview image may be changed when the mobile terminal having the camera 121 is moved by an external force, or when a subject is moved. The depth information may be called 'depth value', 'depth information', etc. The depth information may mean a distance between a subject corresponding to a pixel included in the image, and the mobile terminal (more specifically, the camera).

For instance, if a distance between a subject corresponding to a specific pixel included in the image and the mobile terminal is 'n', depth information of the specific pixel may be a specific value corresponding to the 'n'. The specific value corresponding to the 'n' may be the 'n', or may be a value converted by a preset algorithm.

In a case where coordinates of the image are set as an x-axis and a y-axis perpendicular to the x-axis, the depth information may be a value corresponding to a z-axis perpendicular to each of the x-axis and the y-axis. An absolute value of the depth information may be increased when the distance between the subject and the mobile terminal is increased.

The depth information may be applied to various fields. For instance, the depth information may be used to capture/generate a 3D stereoscopic image (stereoscopy), to generate 3D printing data used in a 3D printer, or to sense a movement of an object (subject) near the mobile terminal.

The mobile terminal of the present invention may extract depth information of an image received through the camera, in various manners. For instance, the controller 180 (refer to FIG. 1A) may extract depth information by a stereo vision method using at least two cameras, by a structure light method using light emitting devices disposed to form a preset pattern, by a time of flight (ToF) method based on a time taken for light emitted from light emitting devices to return by reflection, or by a combination thereof.

Hereinafter, a method for extracting depth information using the structure light method will be explained in more detail.

The structure light method means a method for emitting light to a subject by controlling a plurality of light emitting devices disposed to have a preset pattern, for sensing light reflected from the subject, and for extracting depth information based on the sensed light (or a pattern of the sensed light). For instance, the controller 180 of the mobile terminal according to the present invention controls a plurality of light emitting devices disposed to have a preset pattern, to light emit toward a subject. Then, the controller 180 of the mobile terminal may sense light reflected from the subject, through the camera 121 or the sensing unit 140 (refer to FIG. 1A).

The controller 180 may extract depth information of an image received through the camera 121, based on a result of the sensing. For instance, the controller 180 may extract depth information of an image received through the camera 121, by comparing the preset pattern with a pattern formed by reflected light, or based on a time taken for emitted light to return by reflection, an intensity, etc. For this, the plurality of light emitting devices may be configured to emit light to a space corresponding to the image received through the camera 121.

The preset pattern may be set by a user, or may be preset when the mobile terminal is manufactured. Also, the preset pattern may be changed according to a user's request, or under control of the controller.

The plurality of light emitting devices may emit infrared rays. The light emitting devices may be laser diodes for converting an electric signal into an optical signal, which may be a Vertical Cavity Surface Emitting Laser (VCSEL).

In the present invention, depth information of an image can be extracted by using a single camera (infrared ray camera or 3D camera), according to the structure light method. The depth information of an image may be extracted when the subject has a single color. The depth information of an image may be extracted with an enhanced accuracy, through a combination between the structure light method and the stereo vision method using at least two cameras, or through a combination between the structure light method and the ToF method.

Hereinafter, light emitting devices used to extract depth information of an image received through the camera will be explained in more detail.

Figure 2A:
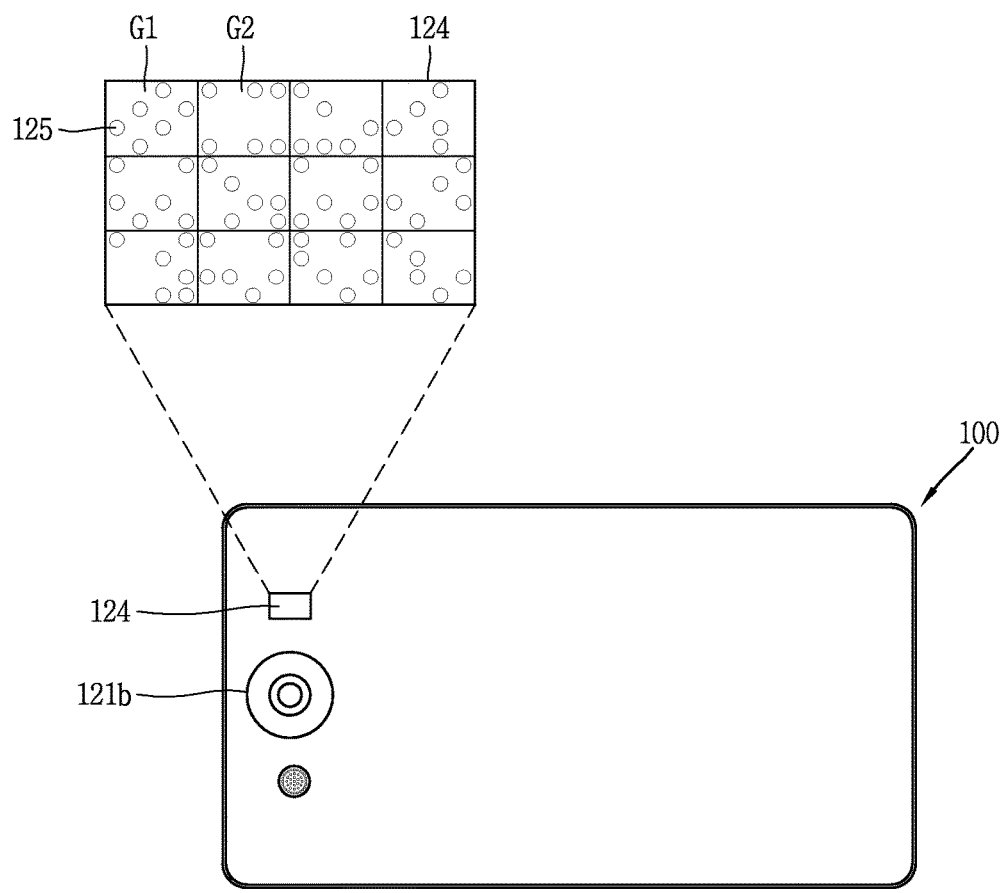
FIGS. 2A to 2C are conceptual views illustrating a light emitting portion of a mobile terminal according to the present invention.
Figure 2A:
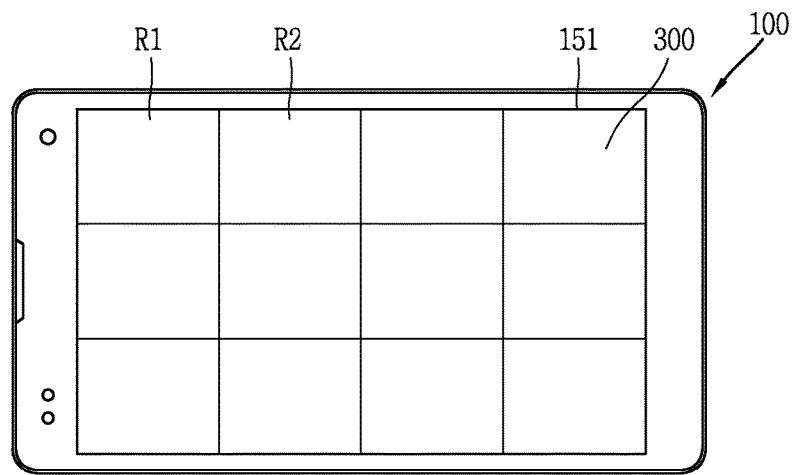
Figure 2B:
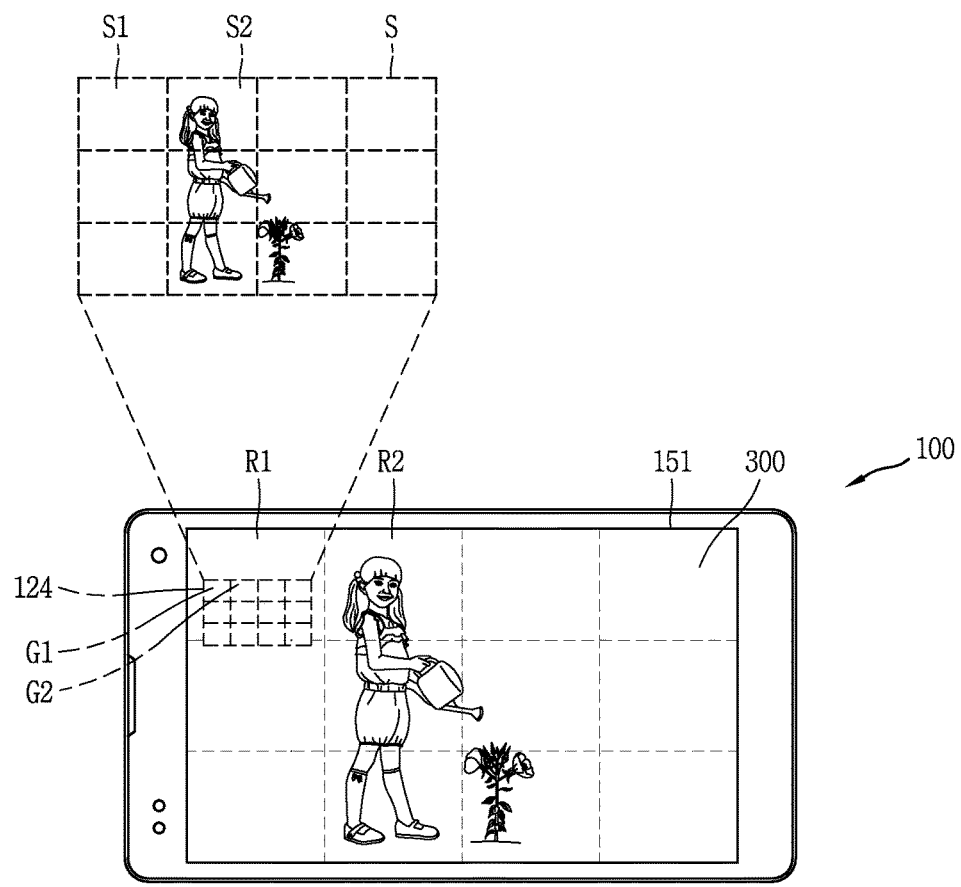
Figure 2C:
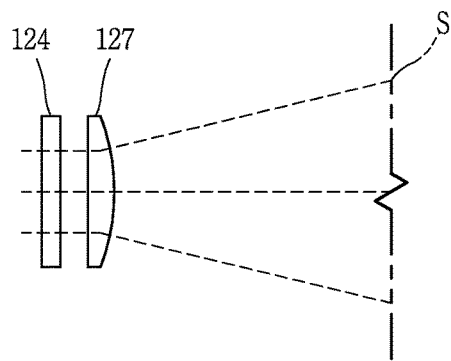

FIGS. 2A to 2C are conceptual views illustrating a light emitting portion of the mobile terminal according to the present invention.

The mobile terminal 100 of the present invention may be provided with a light emitting portion 124. The light emitting portion 124 may have the same configuration or a different configuration as or from the aforementioned flash 124.

Hereinafter, the light emitting portion will have reference number '124'.

The light emitting portion 124 may include at least one light emitting device 125. More specifically, the light emitting portion 124 may be provided with a plurality of light emitting devices 125, and the plurality of light emitting devices 125 may be arranged in various manners. The arrangement of the plurality of light emitting devices 125 will be explained later with reference to FIGS. 3A and 3B.

The light emitting portion 124 may be disposed close to the camera 121. For instance, as shown in FIG. 2A, the light emitting portion 124 may be disposed near the camera 121b. Although not shown, the light emitting portion 124 may be integrally formed with the camera 121b.

As aforementioned, the plurality of light emitting devices 125 included in the light emitting portion 124 may be a Vertical Cavity Surface Emitting Laser (VCSEL), one of infrared ray diodes. Each of the light emitting devices may emit infrared rays toward a subject. Emission of light from the light emitting devices may mean emission of infrared rays from a VCSEL. Alternatively, emission of light from the light emitting devices may mean emission of light having a wavelength of a specific range.

The camera 121b may be a 3D camera or an infrared ray camera used to extract depth information. The camera 121b may include an infrared ray (IR) pass filter for passing infrared rays received from the outside therethrough, and an image sensor for sensing infrared rays. The image sensor may be implemented as a Charge-Coupled Device (CCD) or a Complementary Mental-Oxide Semiconductor (CMOS).

The camera 121b may sense infrared rays received from the outside, i.e., infrared rays emitted from the light emitting devices included in the light emitting portion toward a subject and reflected from the subject. The controller 180 of the mobile terminal may sense infrared rays through the aforementioned sensing unit 140 (e.g., infrared sensor). And the camera 121b may sense light having a specific wavelength.

The light emitting portion 124 may be formed to emit light toward a space corresponding to an image received through the camera 121b. More specifically, the plurality of light emitting devices 125 included in the light emitting portion 124 may emit light toward a space corresponding to an image 300 received through the camera 121b.

The space corresponding to the image 300 received through the camera 121b may mean a space captured by the camera (a view of scene) among a reality space rather than the space occupied by the mobile terminal 100. For instance, the space corresponding to the image 300 received through the camera 121b may be determined based on a viewing angle of the camera.

For instance, a specific light emitting device among the plurality of light emitting devices may be formed to emit light toward a space corresponding to a specific part (or pixel) of an image received through the camera.

The plurality of light emitting devices 125 included in the light emitting portion 124 may be divided into a plurality of groups. Each of the plurality of groups may include at least two light emitting devices. More specifically, the controller 180 may control the plurality of light emitting devices 125 respectively, or may control them by group including at least two light emitting devices. The plurality of light emitting devices may be divided into a plurality of groups having various forms, and the form of the group may be determined by a user's setting or a control of the controller.

For instance, as shown in FIG. 2A, light emitting devices included in a first group (G1) among a plurality of groups (G1, G2, ...) included in the light emitting portion 124 may be formed to emit light toward a space corresponding to a first part (R1) of the image 300 received through the camera 121b.

The light emitting devices included in a second group (G2) among the plurality of groups (G1, G2, ...) included in the light emitting portion 124 may be formed to emit light toward a space corresponding to a second part (R2) of the image 300 received through the camera 121b.

More specifically, referring to FIG. 2B, the image 300 received through the camera may be output to the display unit 151 of the mobile terminal. The image 300 may be an image corresponding to a space captured by the camera (a view of scene, a subject) (S).

The light emitting portion 124 of the mobile terminal may be formed to emit light toward the space (S) corresponding to the image 300.

The light emitting portion 124 may include a plurality of light emitting devices, and the light emitting devices may be divided into a plurality of groups (G1, G2, ...). Light emitting devices included in each group may be formed to emit light toward a space corresponding to a different part of the image 300.

For instance, light emitting devices included in the first group (G1) among the plurality of groups (G1, G2, ...) may be formed to emit light toward a space (S1) corresponding to the first part (R1) of the image 300. And light emitting devices included in the second group (G2) among the plurality of groups (G1, G2, ...) may be formed to emit light toward a space (S2) corresponding to the second part (R2) of the image 300.

For this, referring to FIG. 2C, the light emitting portion 124 may further include a lens 127. The lens 127 may be configured to refract or diffuse light emitted from the light emitting portion 124. The lens 127 may be a single lens corresponding to the light emitting portion 124, or may be a plurality of lenses formed to correspond to the plurality of groups included in the light emitting portion 124. Alternatively, the lens 127 may be a plurality of lenses corresponding to the plurality of light emitting devices included in the light emitting portion 124, respectively.

The lens 127 may be controlled by the controller 180 to emit light emitted from the light emitting portion 124 toward a space corresponding to an image received through the camera. More specifically, when a size of the light emitting portion 124 is larger than that that of the space (S) corresponding to the image 300 received through the camera, the controller 180 may control the lens 127 such that light emitted from the light emitting portion 124 corresponds to the space (S). For this, the lens 127 may be formed to have a curvature change, to have a position shift, or to have a relative rotation.

The aforementioned group may be called a light emitting unit. More specifically, the mobile terminal 100 of the present invention may include the light emitting portion 124 including a plurality of light emitting units. Each of the plurality of light emitting units may include at least two light emitting devices (or a plurality of light emitting devices). The light emitting portion 124 may be called a light emitting module.

As aforementioned with reference to FIGS. 2A to 2C, in the mobile terminal 100 of the present invention, light emitted from an entire part of the light emitting portion 124 may be irradiated onto a space corresponding to an image received through the camera. That is, with reference to FIGS. 2A to 2C, we have explained an example where one light emitting unit (group) among a plurality of light emitting units (groups) included in the light emitting portion 124 emits light to a space corresponding to a part of an image received through the camera.

In another embodiment of the present invention, each of the plurality of light emitting units (groups) included in the light emitting portion 124 may emit light to a space corresponding to an entire part of an image received through the camera.

In this case, a plurality of lenses may be disposed to correspond to the plurality of light emitting units, respectively. That is, a first lens may be provided at a first light emitting unit among the plurality of light emitting units, and a second lens may be provided at a second light emitting unit among the plurality of light emitting units.

For instance, the first light emitting unit among the plurality of light emitting units included in the light emitting portion 124 may emit light to a space corresponding to an image received through the camera. And the second light emitting unit among the plurality of light emitting units included in the light emitting portion 124 may emit light to the space corresponding to the image received through the camera. If a plurality of light emitting devices are formed at the first light emitting unit and the second light emitting unit with the same pattern, and if the first and second light emitting units emit light simultaneously, the amount (intensity or brightness) of light emitted to the space may be two times when compared with a case where only one of the first and second light emitting units emits light. In this case, the amount of light received through the camera (i.e., the amount of light which returns after being reflected at the space) may be two times.

In the present invention, a plurality of lenses may be disposed to correspond to a plurality of light emitting devices, respectively, and a single light emitting device may be formed to emit light to a space corresponding to an image received through the camera.

In the present invention, the plurality of light emitting devices included in the light emitting portion 124 may be controlled to emit light, according to each of the light emitting units. That is, when one of the plurality of light emitting units is controlled to emit light, at least two light emitting devices (or a plurality of light emitting devices) included in the one light emitting unit may be controlled to emit light. Hereinafter, "emitting a specific light emitting unit" may mean "emitting at least two light emitting devices (a plurality of light emitting devices) included in (provided at) a specific light emitting unit".

Hereinafter, the light emitting unit according to the present invention will be explained in more detail with reference the attached drawings.

FIGS. 3A to 3D are conceptual views illustrating light emitting units provided at a light emitting portion according to the present invention.

Figure 3A:
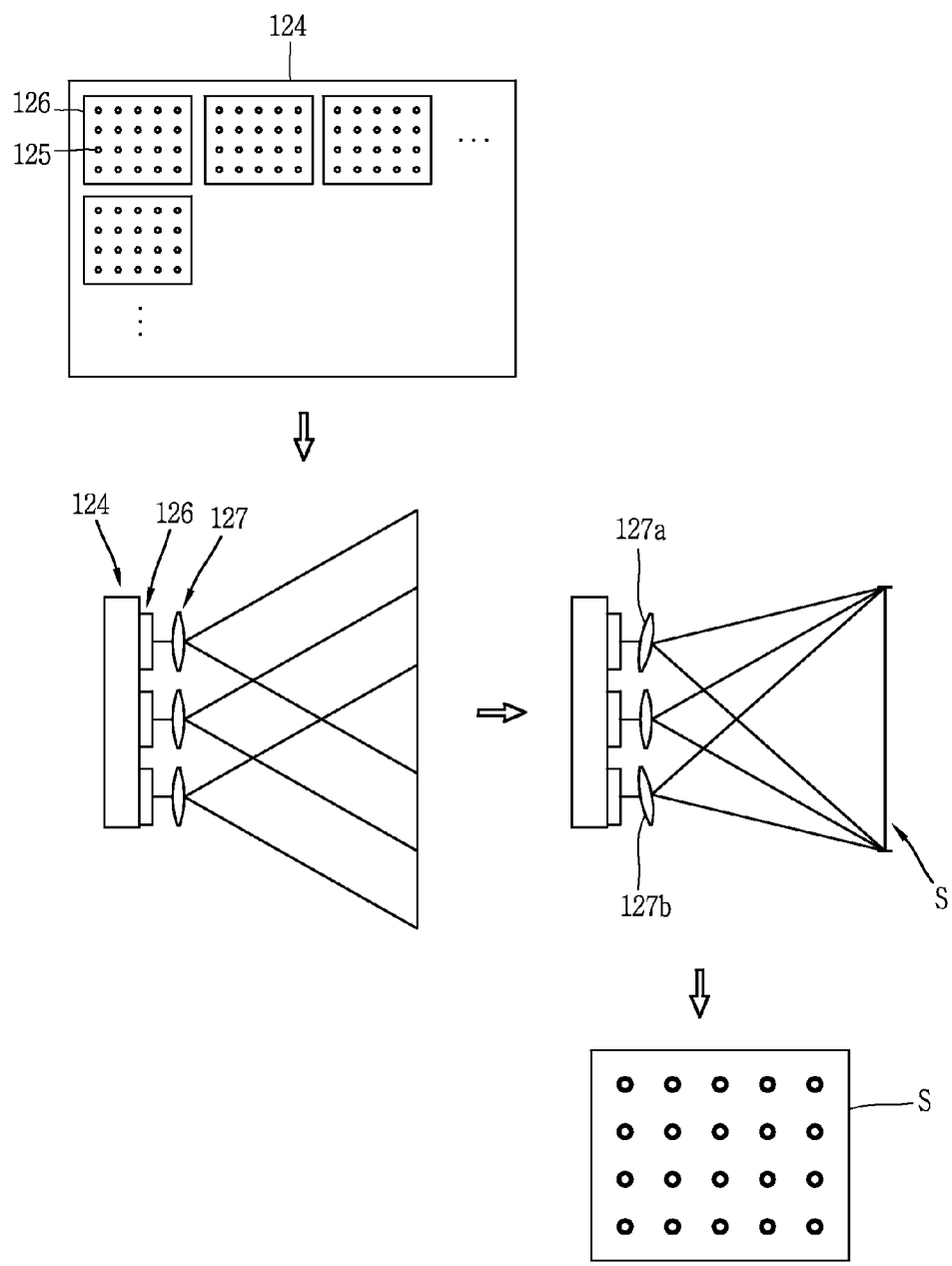
FIGS. 3A to 3D are conceptual views illustrating light emitting units provided at a light emitting portion of a mobile terminal according to the present invention.

Referring to a first drawing of FIG. 3A, the light emitting portion 124 of the mobile terminal 100 according to the present invention may include a plurality of light emitting units 126. For instance, the plurality of light emitting units 126 may be arranged in a matrix form of M×N (M and N are integers). Assuming that the light emitting unit is a single block, a plurality of blocks may be arranged at the light emitting portion 124 in a matrix form of M×N.

A plurality of light emitting devices 125 (or at least two light emitting devices) may be provided at each of the plurality of light emitting units 126.

A plurality of light emitting devices may be arranged at each light emitting unit, with a preset pattern. FIG. 3A illustrates that a plurality of light emitting devices included in each light emitting unit have the same pattern.

More specifically, as shown in the first drawing of FIG. 3A, the plurality of light emitting devices 125 may be formed to have the same pattern at each light emitting unit 126.

As shown in a second drawing of FIG. 3A, the mobile terminal 100 of the present invention may further include a plurality of lenses 127 formed to correspond to the plurality of light emitting units 126, respectively. The number of the lenses 127 may be the same as the number of the light emitting units 126. The plurality of lenses 127 may be called 'micro array lenses', and a single lens may be called a 'micro lens' or 'projection lens'.

Light emitted from the light emitting units 126 may pass through the lenses 127. The light which has passed through the lenses 127 may be refracted or scattered. With such a configuration of the lenses 127, even if the space (S) corresponding to an image received through the camera is larger than the light emitting units 126, light emitted from the light emitting units 126 may be irradiated in correspondence to the space (S).

As shown in a second drawing of FIG. 3A, the plurality of light emitting units 126 are disposed to have a predetermined spacing distance therebetween. With such a structure, when the plurality of light emitting units 126 simultaneously emit light, at least part of the emitted light may not overlap each other. More specifically, light emitted from the first light emitting unit and light emitted from the second light emitting unit may be irradiated onto a specific space with a predetermined distance difference.

The predetermined distance difference may be ignored based on a size of the light emitting unit, a refraction ratio of the lens (the degree of scattering, diffusion and extension), a distance between the light emitting unit and a space to which light is emitted, etc.

For instance, the predetermined distance difference may be reduced when a size of the light emitting unit is decreased, when a ratio of a size of a space to which light is emitted with respect to the size of the light emitting unit is increased, when a refraction ratio of the lens is decreased, and when a distance between the light emitting unit and a space to which light is emitted is increased.

A refraction degree of light emitted from each of the plurality of light emitting units 126 included in the light emitting portion 124 (or a refractivity of the lens) may correspond to a viewing angle of the camera 121. Accordingly, light emitted from a single light emitting unit 126 may be irradiated to correspond to a space corresponding to an image received through the camera.

As shown in a third drawing of FIG. 3A, the controller 180 of the present invention may control the plurality of lenses 127 such that light emitted from the plurality of light emitting units is irradiated to overlap a space corresponding to an image received through the camera. Hereinafter, the space (S) corresponding to the image will be referred to as a subject corresponding to the image.

The subject may include all types of objects which exist within a viewing angle of the camera. For instance, the subject may include a specific object, various objects distant from the specific object based on the camera (e.g., a background image), etc.

The controller 180 may relatively-rotate at least part of the plurality of lenses 127, based on a distance between the subject and the camera (or the light emitting portion 124), such that light emitted from the plurality of light emitting units irradiated to overlap the subject.

The controller 180 may measure a distance between the subject and the camera (or the light emitting portion 124), using at least one of the sensing unit 140, the camera 121 and the light emitting portion 124. Then, the controller 180 may determine a relative-rotation degree of at least part of the plurality of lenses 127, based on the measured distance.

For instance, as shown in the third drawing of FIG. 3A, the controller 180 may relatively-rotate at least part (127a, 127b) of the plurality of lenses 127, such that light emitted from the plurality of light emitting units 126 is irradiated to overlap the subject (S) corresponding to the image.

The degree of the relative-rotation may be determined based on a distance between the subject and the camera. For instance, the controller 180 may more rotate at least part of the plurality of lenses 127 when the distance between the subject and the camera is short. On the contrary, the controller 180 may less rotate at least part of the plurality of lenses 127 when the distance between the subject and the camera is long.

With such a configuration, intensity of light irradiated onto the subject is increased. Thus, even when the subject has a low light reflectivity (i.e., a high light absorption ratio), or even when the subject is distant from the camera 121, depth information of the image corresponding to the subject may be extracted more easily and precisely.

The amount (intensity or brightness) of light irradiated onto the subject (S) corresponding to the image may be increased when the number of the light emitting units which emit light is large. For instance, as shown in a fourth drawing of FIG. 3A, in a case where the plurality of light emitting devices 125 provided at each of the plurality of light emitting units 126 are formed with the same pattern, and in a case where light emitted from the plurality of light emitting units 126 (a plurality of light emitting devices) is irradiated to overlap the subject (S) corresponding to the image, the amount (intensity) of light irradiated onto the subject (S) is increased when the number of the light emitting units which emit light is large.

At the plurality of light emitting units 126 according to an embodiment of the present invention, a plurality of light emitting devices may be arranged with different patterns. More specifically, the plurality of light emitting devices 125 may be formed to have a different pattern according to each light emitting unit.

Figure 3B:
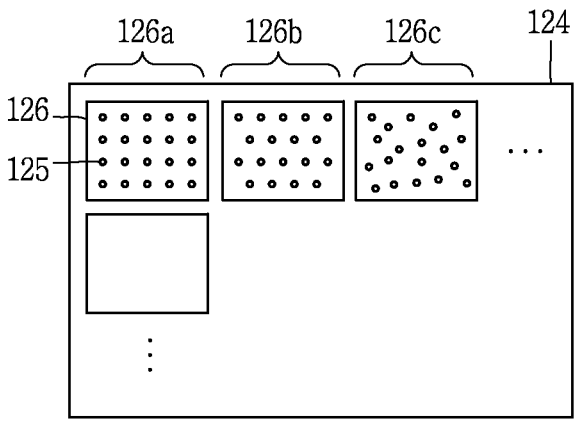
Figure 3B:
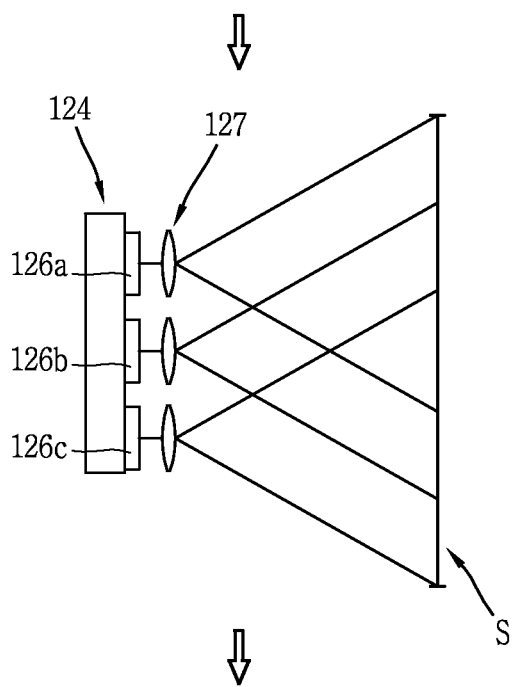
Figure 3B:
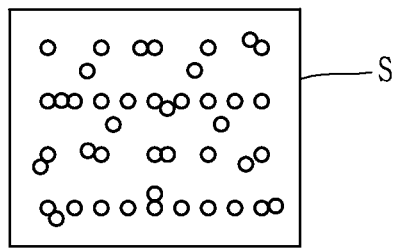

For instance, as shown in a first drawing of FIG. 3B, the plurality of light emitting devices 125 may be formed to have a first pattern on a first light emitting unit 126a among the plurality of light emitting units 126, and the plurality of light emitting devices 125 may be formed to have a second pattern on a second light emitting unit 126b among the plurality of light emitting units 126. Likewise, the plurality of light emitting devices 125 may be formed to have a third pattern different from the first and second patterns, on a third light emitting unit 126c among the plurality of light emitting units 126.

In a case where the plurality of light emitting devices are provided at each light emitting unit 126 with a different pattern, when the number of the light emitting units 126 which emit light is large, the number of points (or the number of pixels, or the number of feature points) of light irradiated on the subject is increased as shown in a third drawing of FIG. 3B. As shown in a second drawing of FIG. 3B, even when light emitted from the plurality of light emitting units is irradiated onto the specific space (S) with a predetermined distance difference, the predetermined distance may be ignored based on a size of the light emitting unit, a refraction ratio of the lens (the degree of scattering, diffusion and extension), a distance between the light emitting unit and a space to which light is emitted, etc.

As the number of points of light irradiated onto the subject is increased, the controller 180 may extract depth information of an image received through the camera more precisely and much more.

The plurality of light emitting devices may be provided at the plurality of light emitting units, in various manners as well as the aforementioned manner.

Figure 3C:
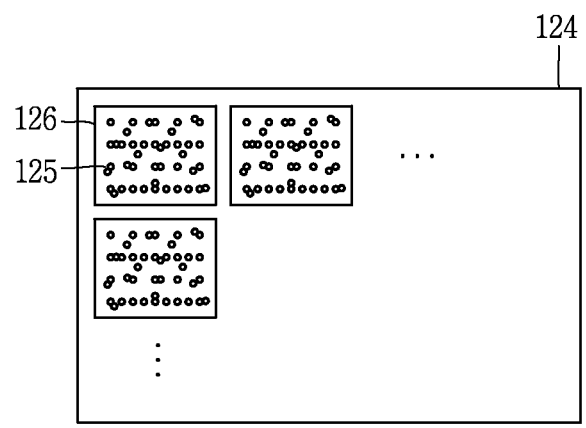
Figure 3D:
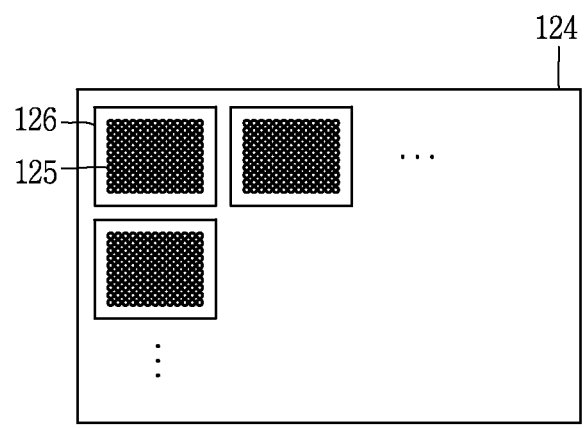

For instance, as shown in FIGS. 3C and 3D, each of the plurality of light emitting units may be provided with the same number of light emitting devices at the same position. For instance, FIG. 3C illustrates that a plurality of light emitting devices included in the first to third light emitting units 126a, 126b, 126c of FIG. 3B are formed at a single light emitting unit, and FIG. 3D illustrates that a plurality of light emitting devices are arranged in a matrix form at preset intervals (or in an adjacent manner).

In this state, the controller 180 may control at least part of the plurality of light emitting devices 125 to emit light, such that the plurality of light emitting units emit light of the same pattern. Alternatively, the controller 180 may control at least part of the plurality of light emitting devices 125 to emit light, such that the plurality of light emitting units emit light of different patterns.

More specifically, as shown in FIG. 3C or 3D, in case of emitting light of the same pattern from the plurality of light emitting units, the controller 180 may control some light emitting devices arranged to have a specific pattern among a plurality of light emitting devices included in a specific light emitting unit, to emit light. And the controller 180 may control some light emitting devices arranged to have the specific pattern among a plurality of light emitting devices included in the remaining light emitting units rather than the specific light emitting unit, to emit light.

On the other hand, in case of emitting light of different patterns from the plurality of light emitting units, the controller 180 may control some light emitting devices arranged to have a specific pattern among a plurality of light emitting devices included in a specific light emitting unit, to emit light. And the controller 180 may control some light emitting devices arranged to have a different pattern from the specific pattern, among a plurality of light emitting devices included in the remaining light emitting units rather than the specific light emitting unit, to emit light.

The number of the light emitting devices which emit light may be determined by a user's setting or under control of the controller. For instance, the number of the light emitting devices which emit light may be determined based on a distance between a subject corresponding to an image and the camera, the amount of light emitted from the light emitting units and then reflected from the subject, a condition of peripheral light, a type of an operation mode related to depth information, etc.

With such a configuration, the present invention may provide a hardware (light emitting portion) for effectively extracting depth information of an image corresponding to a subject, using a plurality of light emitting units.

The mobile terminal according to an embodiment of the present invention, which can include at least one of the aforementioned components, may control a plurality of light emitting units in various manners according to various conditions. Hereinafter, a method for controlling a plurality of light emitting units in various manners according to various conditions will be explained in more detail with reference to the attached drawings.

Figure 4:
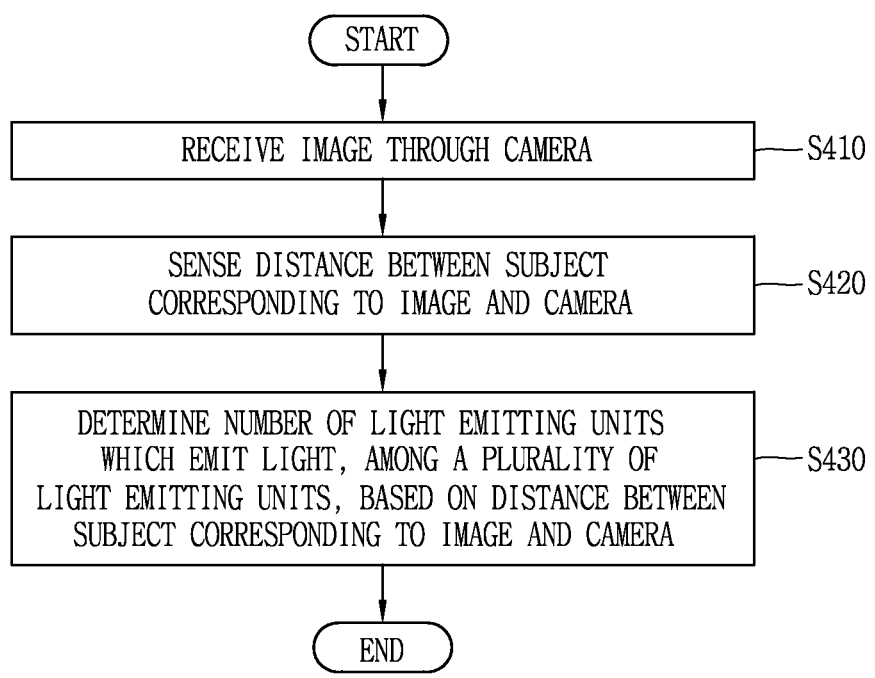
FIG. 4 is a flowchart illustrating a method for controlling a mobile terminal according to the present invention.
Figure 5A:
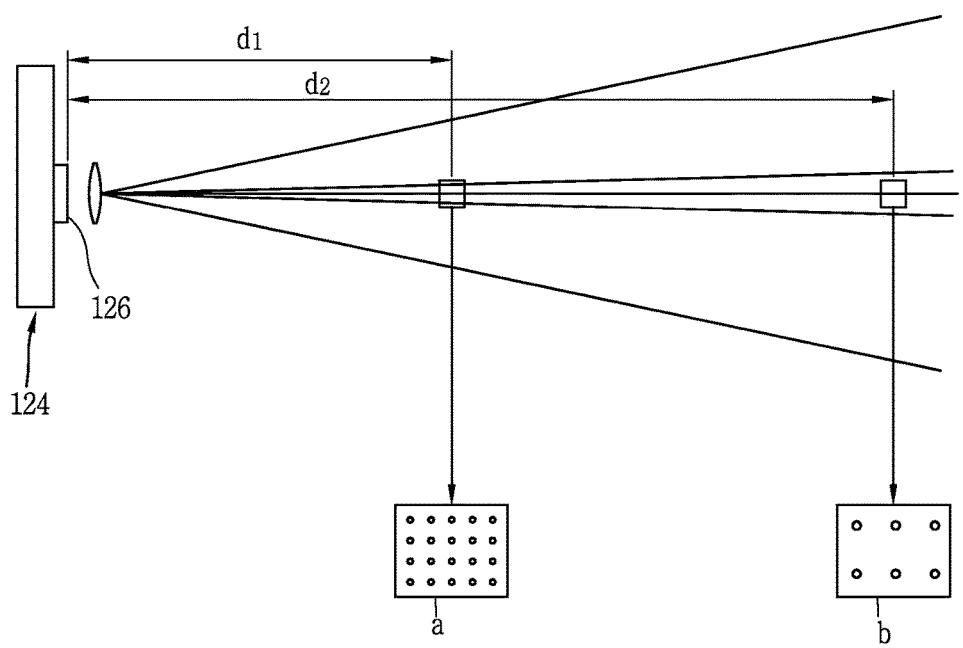
FIGS. 5A and 5B are conceptual views illustrating the control method for FIG. 4.
Figure 5B:
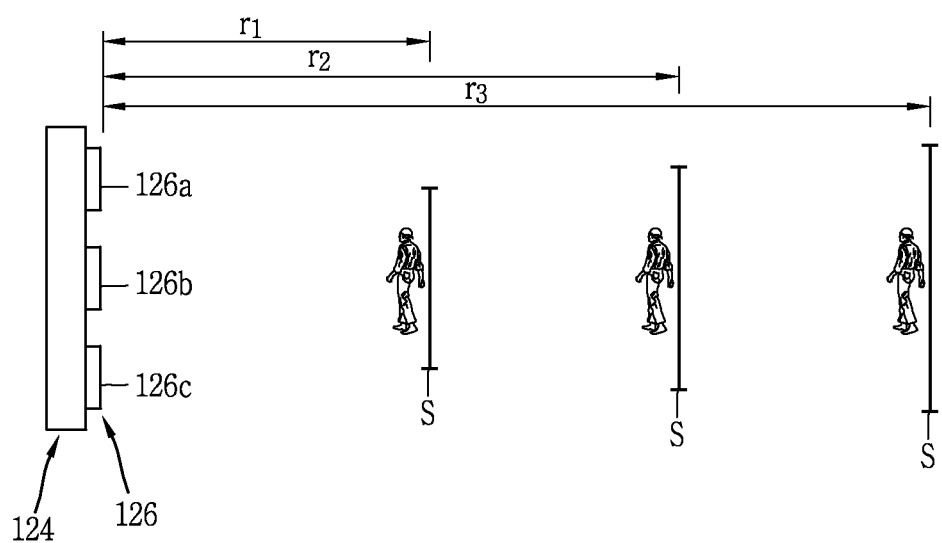

FIG. 4 is a flowchart illustrating a method for controlling a mobile terminal according to the present invention, and FIGS. 5A and 5B are conceptual views illustrating the control method for FIG. 4.

Referring to FIG. 4, an image is received through the camera (S410). The image received through the camera may be output to the display unit 151. The camera may be activated according to a user's request.

For instance, the camera may be activated as an application related to a camera is executed.

Then, a distance between a subject (space) corresponding to the image and the camera (or the light emitting portion 124 of the mobile terminal 100) is sensed (S420). More specifically, the controller 180 may sense (extract or determine) a distance between the subject corresponding to the image received through the camera 121, and the camera 121, according to a user's request.

For instance, the controller 180 may measure a distance between the subject and the camera, using at least one of the sensing unit 140, the light emitting portion 124 and the camera 121. In this case, the distance may be an average distance of subjects corresponding to an entire part of an image received through the camera 121, or may be a distance between the subject and the camera, the subject corresponding to a region set according to a user's request (e.g., touch, drag touch, etc.) among an image received through the camera.

Then, based on the distance between the subject corresponding to the image and the camera, the number of light emitting units which emit light, among the plurality of light emitting units included in the light emitting portion 124, is determined (S430).

For instance, when the distance between the subject and the camera is long, the controller 180 may increase the number of light emitting units which emit light. On the other hand, when the distance between the subject and the camera is short, the controller 180 may decrease the number of light emitting units which emit light. That is, the number of light emitting units which emit light, among the plurality of light emitting units included in the light emitting portion 124, may be increased when the distance is long, and may be decreased when the distance is short.

Referring to FIG. 5A, when the distance between the subject and the camera becomes longer, the number of points of light irradiated onto a unitary area is gradually reduced. For instance, the number of points of light irradiated onto a unitary area (a) having a distance of 'd1' may be larger than the number of points of light irradiated onto a unitary area (b) having a distance of 'd2' longer than 'd1'.

Further, when the distance between the subject and the camera becomes longer, at least one of the amount of light irradiated onto the subject, and the amount of light irradiated onto the subject and then reflected from the subject is gradually reduced.

The controller 180 may control a larger number of light emitting units to emit light when the distance between the subject and the camera is longer.

For instance, as shown in FIG. 5B, when a distance between a space (S) corresponding to an image received through the camera (or a subject P) and the camera (or the light emitting portion 124 of the mobile terminal 100) is 'r1', the controller 180 may control one light emitting unit 126a among the plurality of light emitting units to emit light. When the distance between the space (S) and the camera is 'r2' longer than 'r1', the controller 180 may control two light emitting units 126a, 126b to emit light. And when the distance between the space (S) and the camera is 'r3' longer than 'r2', the controller 180 may control three light emitting units 126a, 126b, 126c to emit light.

Light emitted from the plurality of light emitting units may be irradiated to correspond to the subject corresponding to the image received through the camera.

A plurality of light emitting devices included in the plurality of light emitting units may be formed to have the same pattern or different patterns.

Figure 6A:
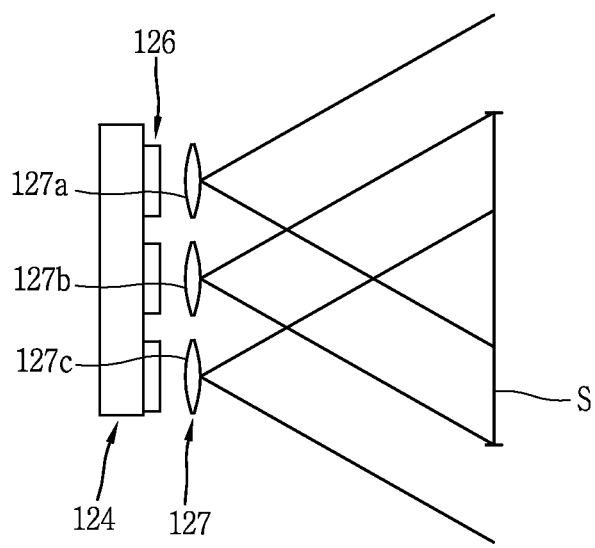
FIGS. 6A and 6B are conceptual views illustrating an embodiment where a plurality of light emitting devices are arranged at each of a plurality of light emitting units with the same pattern according to the present invention.
Figure 6A:
Figure 6A:
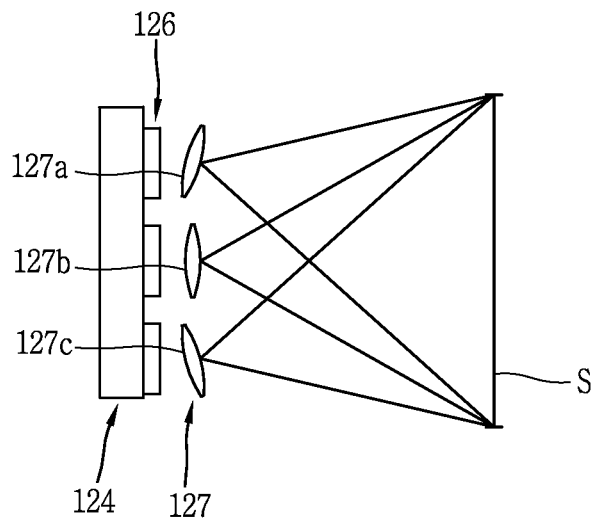
Figure 6B:
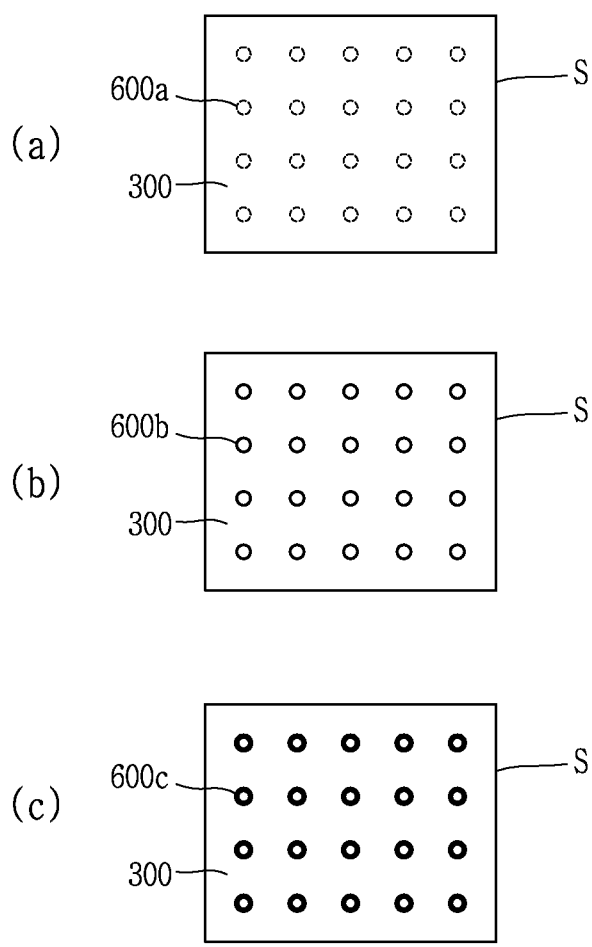

FIGS. 6A and 6B are conceptual views illustrating an embodiment where a plurality of light emitting devices are arranged at each of a plurality of light emitting units with the same pattern according to the present invention.

In a case where a plurality of light emitting devices included in the plurality of light emitting units are formed to have the same pattern, the controller 180 may control the plurality of lenses 127 arranged to correspond to the plurality of light emitting units, such that light emitted from the plurality of light emitting units overlaps the subject (or the space) (S) corresponding to the image more precisely.

Referring to a first drawing of FIG. 6A, the plurality of light emitting units 126 are arranged to have a predetermined spacing distance therebetween. With such a configuration, when the plurality of light emitting units 126 simultaneously light emit, at least part of the emitted light may not overlap each other. More specifically, light emitted from the first light emitting unit and light emitted from the second light emitting unit may be irradiated onto a specific space with a predetermined distance difference.

As shown in a second drawing of FIG. 6A, the controller 180 of the present invention may control the plurality of lenses 127 such that light emitted from the plurality of light emitting units is irradiated to overlap a space corresponding to an image received through the camera.

The controller 180 may relatively-rotate at least part of the plurality of lenses 127, based on a distance between the subject and the camera (or the light emitting portion 124), such that light emitted from the plurality of light emitting units is irradiated to overlap the subject.

The controller 180 may measure a distance between the subject and the camera (or the light emitting portion 124), using at least one of the sensing unit 140, the camera 121 and the light emitting portion 124. Then, the controller 180 may determine a relative-rotation degree of at least part of the plurality of lenses 127, based on the measured distance.

For instance, as shown in the second drawing of FIG. 6A, the controller 180 may relatively-rotate at least part (127a, 127b) of the plurality of lenses 127, such that light emitted from the plurality of light emitting units 126 is irradiated to overlap the subject (S) corresponding to the image.

The degree of the relative-rotation may be determined based on a distance between the subject and the camera. For instance, the controller 180 may more rotate at least part (127a, 127c) of the plurality of lenses 127 when the distance between the subject and the camera is short. On the contrary, the controller 180 may less rotate at least part (127a, 127c) of the plurality of lenses 127 when the distance between the subject and the camera is long.

The predetermined distance difference may be ignored based on a size of the light emitting unit, a refraction ratio of the lens (the degree of scattering, diffusion and extension), a distance between the light emitting unit and a space to which light is emitted, etc.

For instance, the predetermined distance difference may be reduced when a size of the light emitting unit is decreased, when a ratio of a size of a space to which light is emitted with respect to the size of the light emitting unit is increased, when a refraction ratio of the lens is decreased, and when a distance between the light emitting unit and a space to which light is emitted is increased.

If the current condition corresponds to a condition under which the predetermined distance can be ignored, the controller 180 may not relatively-rotate the plurality of lenses 127.

The relative-rotation of the plurality of lenses 127 may be applied not only to a case where the plurality of light emitting devices included in the plurality of light emitting units are formed to have the same pattern, but also to a case where the plurality of light emitting devices included in the plurality of light emitting units are formed to have different patterns.

The amount (intensity or brightness) of light emitted to the subject (S) corresponding to the image may be increased when the number of light emitting units which emit light is increased. For instance, as shown in FIG. 6B, if the plurality of light emitting devices 125 provided at each of the plurality of light emitting units 126 are formed to have the same pattern, and if light emitted from the plurality of light emitting units 126 (the plurality of light emitting devices) is irradiated to overlap the subject corresponding to the image, the amount (intensity or brightness) of light emitted to the subject may be increased when the number of light emitting units which emit light is increased The amount (intensity or brightness) of light irradiated onto the subject may be increased when the number of light emitting units which emit light is increased. For instance, assuming that the amount of light emitted from a single light emitting device (or a single light emitting unit) is 'p', if 'n' light emitting units simultaneously emit light, the amount of light irradiated onto the subject (a single point of light) may be 'n" p'.

In this case, if a single light emitting unit emits light as shown in FIG. 6B(a), the amount of light sensed by at least one of the sensing unit 140, the camera 121 and the light emitting portion 124 may be a first amount (600*a*). If two light emitting units emit light as shown in FIG. 6B(b), the amount of light may be a second amount (600*b*) corresponding to two times of the first amount. If three light emitting units emit light as shown in FIG. 6B(c), the amount of light may be a second amount (600*c*) corresponding to three times of the first amount.

Figure 7A:
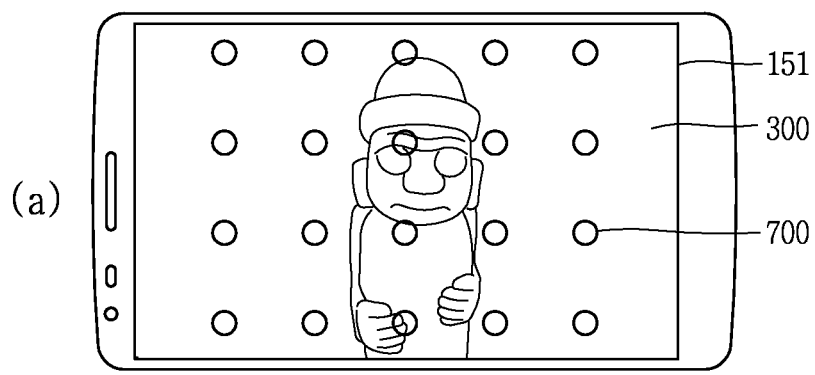
FIGS. 7A and 7B are conceptual views illustrating an embodiment where a plurality of light emitting devices are arranged at each of a plurality of light emitting units with a different pattern according to the present invention.
Figure 7A:
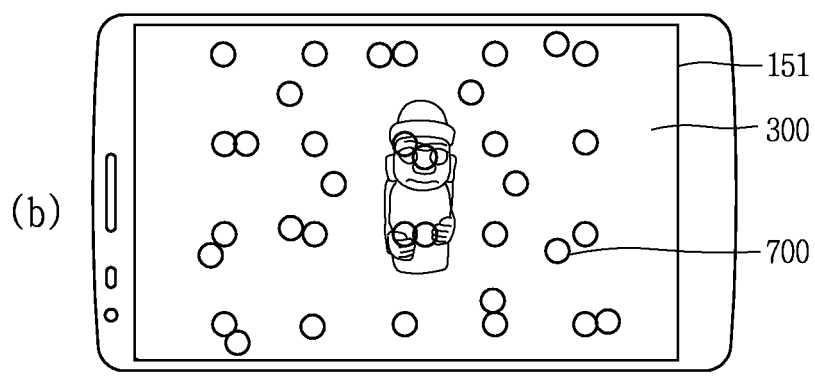
Figure 7B:
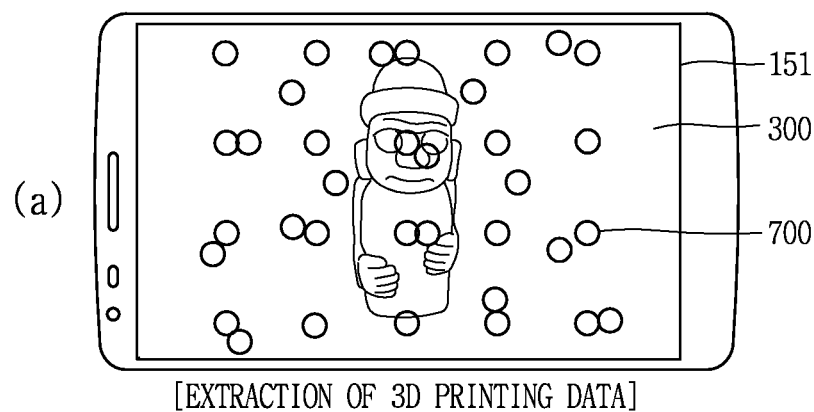
Figure 7B:
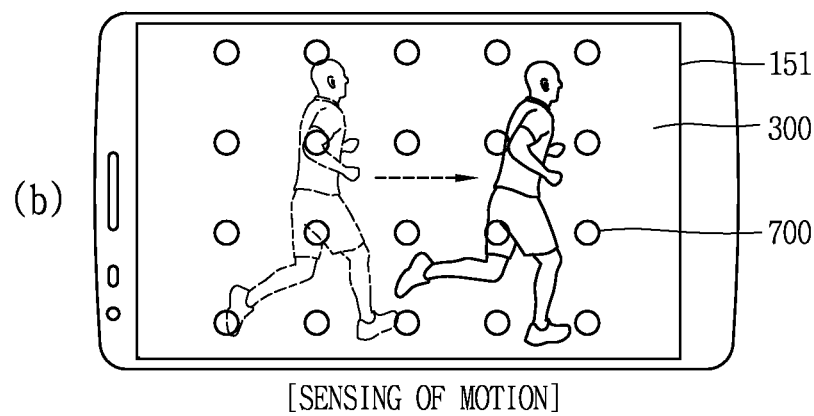

FIGS. 7A and 7B are conceptual views illustrating an embodiment where a plurality of light emitting devices are arranged at each of a plurality of light emitting units with a different pattern according to the present invention.

In a case where a plurality of light emitting devices are arranged at each of the plurality of light emitting units 126 with a different pattern, when the number of the light emitting units 126 which emit light is increased, the number of points of light irradiated onto the subject (or the number of pixels, or the number of features points) is increased.

As the number of points of light irradiated onto the subject is increased, the controller 180 may extract depth information of an image received through the camera, more precisely and much more.

For instance, when a distance between the subject and the camera is long, the number of light emitting units which emit light may be increased. For instance, as shown in FIG. 7A(a), when the distance between the subject and the camera is a first distance, a predetermined number of light emitting units may emit light.

As shown in FIG. 7A(b), when the distance between the subject and the camera is a second distance longer than the first distance, a larger number of light emitting units than the specific number may emit light.

Since the plurality of light emitting devices included in the plurality of light emitting units are formed to have different patterns, the number of points of light irradiated onto the subject (or space) corresponding to the image 300 received through the camera is increased.

With such a configuration, if the number of points of light irradiated onto a unitary area is reduced as the distance between the subject and the camera becomes long, a larger number of light emitting units which are formed to have different patterns emit light, thereby increasing the number of points of light. Thus, in the present invention, even if the distance between the subject and the camera becomes long, depth information may be extracted precisely.

The number of light emitting units which emit light, among the plurality of light emitting units, may be changed based on various conditions, as well as a distance between a subject corresponding to an image and the camera.

More specifically, in the present invention, the number of light emitting devices which emit light, among the plurality of light emitting units, may be determined based on the amount of light emitted from the light emitting units and then reflected from the subject, a condition of peripheral light, a type of an operation mode related to depth information, etc.

For instance, when the amount of light emitted from the light emitting units and then reflected from the subject is smaller than a reference amount, the controller 180 may increase the number of light emitting units which emit light. As another example, the controller 180 may determine a condition of light around the mobile terminal 100, using at least one of the sensing unit 140, the camera 121 and the light emitting portion 140. For instance, when peripheral light (e.g., infrared rays rather than light emitted from the light emitting units) is irradiated onto the subject with the amount more than a reference amount, the controller 180 may increase the number of light emitting units which emit light.

As still another example, the controller 180 may determine the number of light emitting units which emit light, based on a type of an operation mode related to depth information. The operation mode related to depth information may mean an application using depth information (or a function).

For instance, as shown in FIG. 7B(a), in an operation mode (first operation mode) requiring extraction of depth information in a more precise manner (e.g., a mode for extracting/generating 3D printing data used in a 3D printer), the controller 180 may control a predetermined number of light emitting units to emit light. As another example, as shown in FIG. 7B(b), in an operation mode (second operation mode) requiring extraction of depth information in a simple manner (e.g., a mode for sensing a motion of a subject), the controller 180 may control a smaller number of light emitting units than the predetermined number, to emit light.

The number of light emitting units which emit light may be preset by operation mode (by application). Even if the number of light emitting units which emit light is preset by operation mode, it may be changed based on a distance between the subject and the camera, the amount of light emitted from the light emitting units and then reflected from the subject, a condition of peripheral light, etc.

The aforementioned embodiment may be applied to a case where a plurality of light emitting devices included in the plurality of light emitting units are formed to have the same pattern, or a case where the plurality of light emitting devices included in the plurality of light emitting units are formed to have different patterns.

The mobile terminal of the present invention may have a configuration implemented as one or more of the aforementioned configurations with reference to FIGS. 3A to 7B, are combined with each other.

Figure 8:
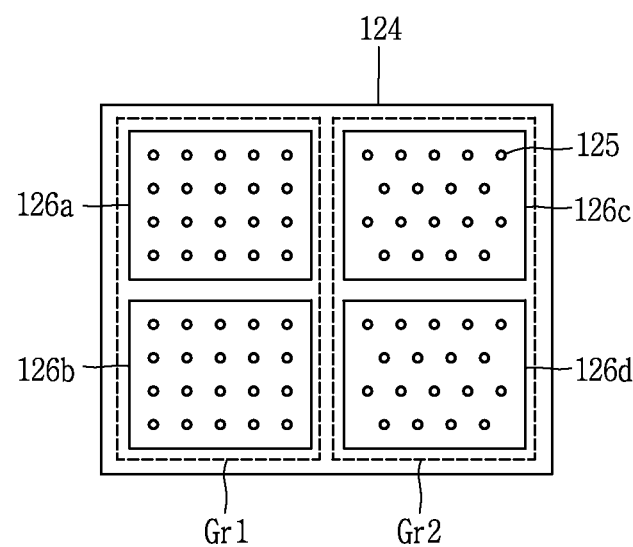
FIG. 8 is a conceptual view illustrating a method for controlling a plurality of light emitting units by group, by a mobile terminal according to the present invention.

FIG. 8 is a conceptual view illustrating a method for controlling a plurality of light emitting units by group, by a mobile terminal according to the present invention.

So far, we have explained a case where a plurality of light emitting devices included in a plurality of light emitting units are formed to have the same pattern or different patterns.

The light emitting portion 124 of the mobile terminal according to the present invention may include a plurality of light emitting units. Each of the plurality of light emitting units may include a plurality of light emitting devices.

The plurality of light emitting units may be grouped such that at least two light emitting units belong to a single group. Light emitting units included in each group may have a plurality of light emitting devices formed to have the same pattern, and light emitting units included in a different group may have a plurality of light emitting devices formed to have a different pattern.

For instance, as shown in FIG. 8, a first light emitting unit 126a and a second light emitting unit 126b may be grouped into a first group (Gr1), and a third light emitting unit 126c and a fourth light emitting unit 126d may be grouped into a second group (Gr2).

Each group may include at least two light emitting units. Also, light emitting units included in each group may have a plurality of light emitting devices formed to have the same pattern.

For instance, the light emitting units included in the first group (Gr1) may have a plurality of light emitting devices formed to have a first pattern, and the light emitting units included in the first group (Gr2) may have a plurality of light emitting devices formed to have a second pattern.

That is, it may be understood that at least two light emitting units arranged such that a plurality of light emitting devices thereof have the same pattern, belong to a single group.

Then, the controller 180 may control the plurality of light emitting units by group, based on a distance between a subject corresponding to an image and the camera, the amount of light emitted from the light emitting units and then reflected from the subject, a condition of peripheral light, a type of an operation mode related to depth information, etc.

Light emitting units included in one group may be arranged to be close to each other, or may be arranged to be alternate with light emitting units included in another group (or may be arranged arbitrarily). Even if the light emitting units included in one group are arranged to be alternate with the light emitting units included in another group (or arranged arbitrarily), the controller 180 may control the plurality of light emitting units by group (in the unit of group).

For instance, when a distance between the subject and the camera is within a preset range, the controller 180 may control only the light emitting units included in the first group, among the plurality of light emitting units, to emit light.

As another example, when a distance between the subject and the camera is out of a preset range, when the amount of peripheral light is large, or when the amount of light reflected is smaller than a reference amount, the controller 180 may control the entire light emitting units (e.g., the light emitting units included in the first and second groups), to emit light.

If the light emitting portion 124 is implemented as that shown in FIG. 8, the descriptions aforementioned with reference to FIGS. 3A to 7B may be applied.

For instance, in case of controlling only light emitting units having the same pattern, the controller 180 may control at least part of a plurality of light emitting units included in one group, among a plurality of groups, to emit light. For instance, when a distance between the subject and the camera is short, the controller 180 may control only the first light emitting unit 126a among the light emitting units included in the first group (Gr1), to emit light. On the contrary, when a distance between the subject and the camera is long, the controller 180 may control all of the first and second light emitting unit 126a, 126b included in the first group (Gr1), to emit light.

As another example, in case of controlling light emitting units having different patterns, the controller 180 may control at least part of a plurality of light emitting units included in each group (Gr1, Gr2), to emit light. For instance, when a distance between the subject and the camera is short, the controller 180 may control only the first light emitting unit 126a among the light emitting units included in the first group (Gr1), to emit light. On the contrary, when a distance between the subject and the camera is long, the controller 180 may control the first light emitting unit 126a included in the first group (Gr1) and the third light emitting unit 126c included in the second group (Gr2), to emit light.

With such a configuration, the present invention can have the following advantages.

Firstly, when depth information is extracted, light emitting units having the same pattern or different patterns emit light adaptively, based on a distance between the subject and the camera, the amount of light emitted from the light emitting units and then reflected from the subject, a condition of peripheral light, a type of an operation mode related to depth information, etc. This can provide a hardware for extracting depth information in an optimum manner, and a method for controlling the mobile terminal.

Secondly, a smaller number of light emitting units emit light according to an operation mode related to depth information, when a distance between the subject and the camera is shorter, when the amount of light emitted from the light emitting units and then reflected from the subject is larger, and when the amount of peripheral light is smaller. This can maximize power efficiency.

As aforementioned, the present invention can provide a method for extracting depth information of part of an image received through a camera, in an optimum manner, by determining the number of light emitting units which emit light among a plurality of light emitting units, based on a distance between a subject corresponding to the image and the camera.

Further, depth information can be extracted in an optimum manner according to a situation, as a plurality of light emitting devices included in a plurality of light emitting units are arranged to have the same pattern or different patterns.

Further, depth information of an image received through the camera can be extracted with a high success rate, with a minimized power of the light emitting devices.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a camera;
   a light emitting portion including a plurality of light emitting units, wherein each of the plurality of light emitting units includes a plurality of light emitting devices, each of the plurality of light emitting devices is a laser diode, and the plurality of light emitting units have a same pattern;
   a plurality of lenses corresponding to the plurality of light emitting units, each of the plurality of lenses corresponding to a respective one of the plurality of light emitting units; and
   a controller configured to:
      cause the light emitting portion to emit light to obtain depth information of an image received via the camera;
      control a number of light emitting units that emit light among the plurality of light emitting units based on a distance between a subject corresponding to the image and the camera such that the number of the light emitting units among the plurality of light emitting units increases as the distance increases;
      control a first light emitting unit among the plurality of light emitting units to emit light when the distance is a first distance;
      control the first light emitting unit and a second light emitting unit among the plurality of light emitting units to emit light when the distance is a second distance that is greater than the first distance; and
      rotate at least part of the plurality of lenses based on the distance between the subject and the camera such that the light is irradiated to overlap the subject,
      wherein the at least part of the plurality of lenses are rotated by a first angle when the distance is the first distance, and the at least part of the plurality of lenses are rotated by a second angle that is smaller than the first angle when the distance is the second distance.

2. The mobile terminal of claim 1, wherein the number of light emitting units decreases when the distance becomes shorter.

3. The mobile terminal of claim 1, wherein light emitting devices included in a same light emitting unit among the plurality of light emitting units have a same pattern.

4. The mobile terminal of claim 1, wherein the number of light emitting units is determined further based on at least one of an amount of light emitted from the light emitting units and reflected from the subject or a condition of peripheral light.

5. The mobile terminal of claim 1, wherein a pattern of light emitting devices included in one of the plurality of light emitting units is different from patterns of light emitting devices included in other light emitting units among the plurality of light emitting units.

6. The mobile terminal of claim 5, wherein the controller is further configured to determine the number of light emitting units further based on a type of an operation mode related to the depth information.

7. The mobile terminal of claim 6, wherein the determined number of light emitting units increases when the distance is increased.

8. The mobile terminal of claim 1, wherein:
   the plurality of light emitting units are grouped such that at least two of the plurality of light emitting units belong to a single group;
   light emitting units included in each group have light emitting devices that have a same pattern; and
   light emitting units included in different groups have light emitting devices that have different patterns.

9. The mobile terminal of claim 8, wherein the controller is further configured to control the plurality of light emitting units by group based on at least one of the distance between the subject and the camera, an amount of light emitted from the plurality of light emitting units and reflected from the subject, a condition of peripheral light, or a type of an operation mode related to the depth information.

10. A method for controlling a mobile terminal comprising a camera and a light emitting portion, the method comprising:
   receiving an image via the camera;
   determining a distance between a subject corresponding to the image and the camera;
   controlling a number of light emitting units that emit light among a plurality of light emitting units included in the light emitting portion based on a distance between the subject and the camera such that the number of the light emitting units among the plurality of light emitting units increases as the distance increases, the plurality of light emitting units having a same pattern;
   controlling a first light emitting unit among the plurality of light emitting units to emit light when the distance is a first distance;
   controlling the first light emitting unit and a second light emitting unit among the plurality of light emitting units to emit light when the distance is a second distance that is greater than the first distance; and rotating at least part of a plurality of lenses corresponding to the plurality of light emitting units based on the distance between the subject and the camera such that the light is irradiated to overlap the subject, wherein the at least part of the plurality of lenses are rotated by a first angle when the distance is the first distance, and the at least part of the plurality of lenses are rotated by a second angle that is smaller than the first angle when the distance is the second distance.

11. The method of claim 10, wherein the number of light emitting units decreases when the distance becomes shorter.

12. The method of claim 10, wherein light emitting devices included in a same light emitting unit among the plurality of light emitting units have a same pattern.

13. The method of claim 10, wherein the number of light emitting units is determined further based on at least one of an amount of light emitted from the light emitting units and reflected from the subject or a condition of peripheral light.

14. The method of claim 10, wherein a pattern of light emitting devices included in one of the plurality of light emitting units is different from patterns of light emitting devices included in other light emitting units among the plurality of light emitting units.

15. The method of claim 14, wherein the number of light emitting units is determined further based on a type of an operation mode related to the depth information.

16. The method of claim 15, wherein the determined number of light emitting units increases when the distance is increased.

* * * * *